United States Patent [19]

Reaves

[11] Patent Number: 5,810,550

[45] Date of Patent: Sep. 22, 1998

[54] METHOD AND APPARATUS FOR PRODUCT SEPARATION AND STACKING

[75] Inventor: Randall M. Reaves, Granbury, Tex.

[73] Assignee: Pinnacle Brands, Inc., Grand Prairie, Tex.

[21] Appl. No.: 785,027

[22] Filed: Jan. 16, 1997

Related U.S. Application Data

[63] Continuation of Ser. No. 421,738, Apr. 13, 1995, abandoned.

[51] Int. Cl.[6] .................................................. B65G 47/19
[52] U.S. Cl. ...................... 414/788.1; 193/44; 198/418.7; 198/446; 198/453; 198/533; 414/802
[58] Field of Search .................................. 15/306.1, 346; 53/532; 194/344; 193/DIG. 1, 2 B, 44; 198/418.7, 418.9, 419.3, 446, 453, 493, 495, 533; 414/788.1

[56] References Cited

U.S. PATENT DOCUMENTS

| | | |
|---|---|---|
| 1,033,446 | 7/1912 | Morton .............................. 198/446 X |
| 1,582,820 | 4/1926 | Hungerford ...................... 414/798.5 X |
| 2,745,537 | 5/1956 | Cadman .............................. 198/533 X |
| 3,474,891 | 10/1969 | Kamila .................................. 193/44 X |
| 4,677,283 | 6/1987 | Lewis .................................. 198/446 X |
| 5,351,354 | 10/1994 | Hasumi et al. ..................... 15/306.1 X |

Primary Examiner—Janice L. Krizek
Attorney, Agent, or Firm—Baker & Botts, L.L.P.

[57] ABSTRACT

Manufactured products, for example those produced by a die press, may be cleaned, separated, randomized and stacked with the apparatus of the present invention. A first conveyor system removes contaminants from the products. A second conveyor system separates and randomizes the products, for example, by allowing the products to cascade down an inclined conveyor belt. The conveyor is segmented to capture a portion of the products as they are pulled downward by gravitational forces. The products are aligned on a shaker table with any of several operator stations. In one embodiment the products pass through a funneling array, a slot and into a stacking tube from which operators may remove stacks of the product in preparation for shipping.

33 Claims, 5 Drawing Sheets

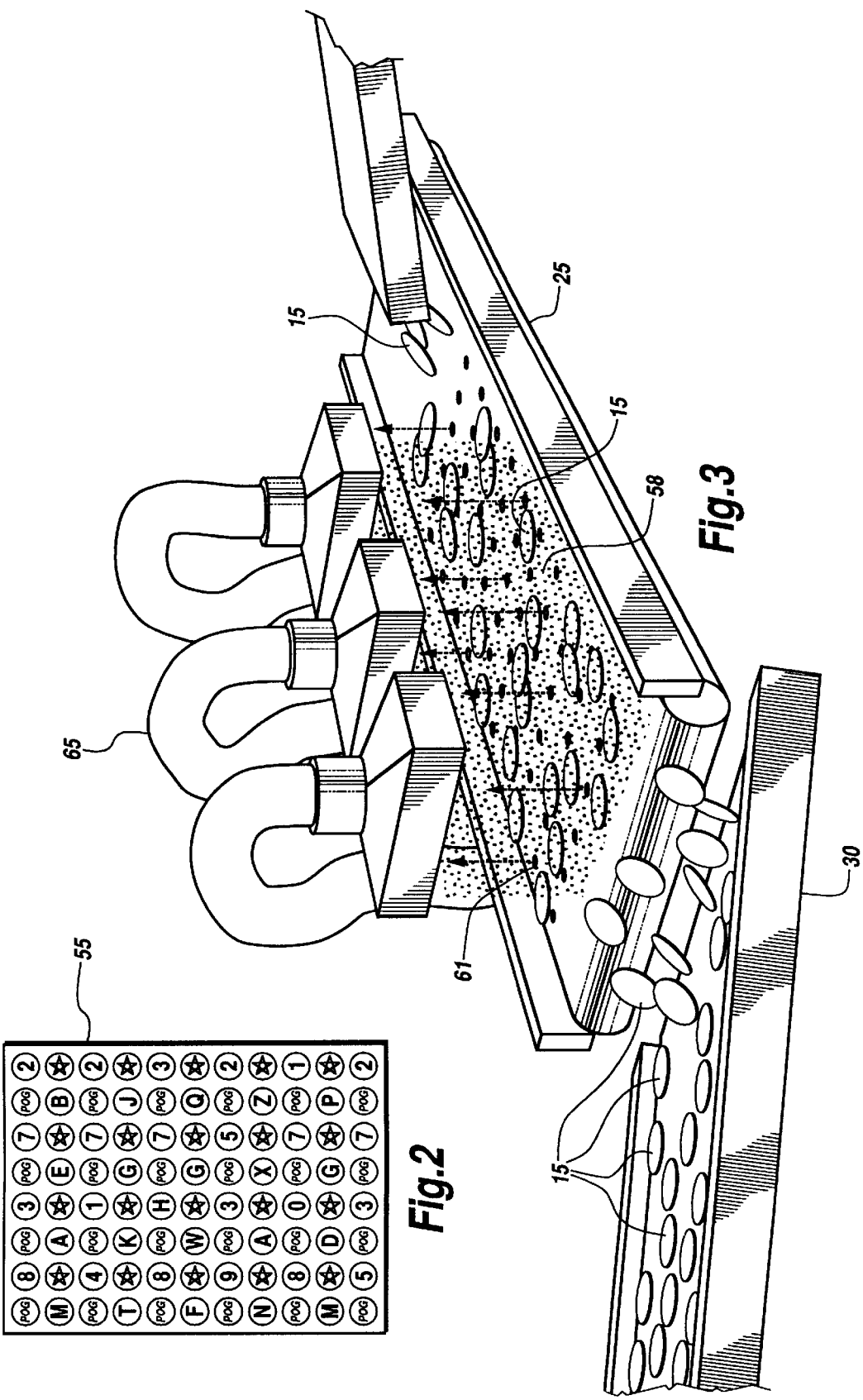

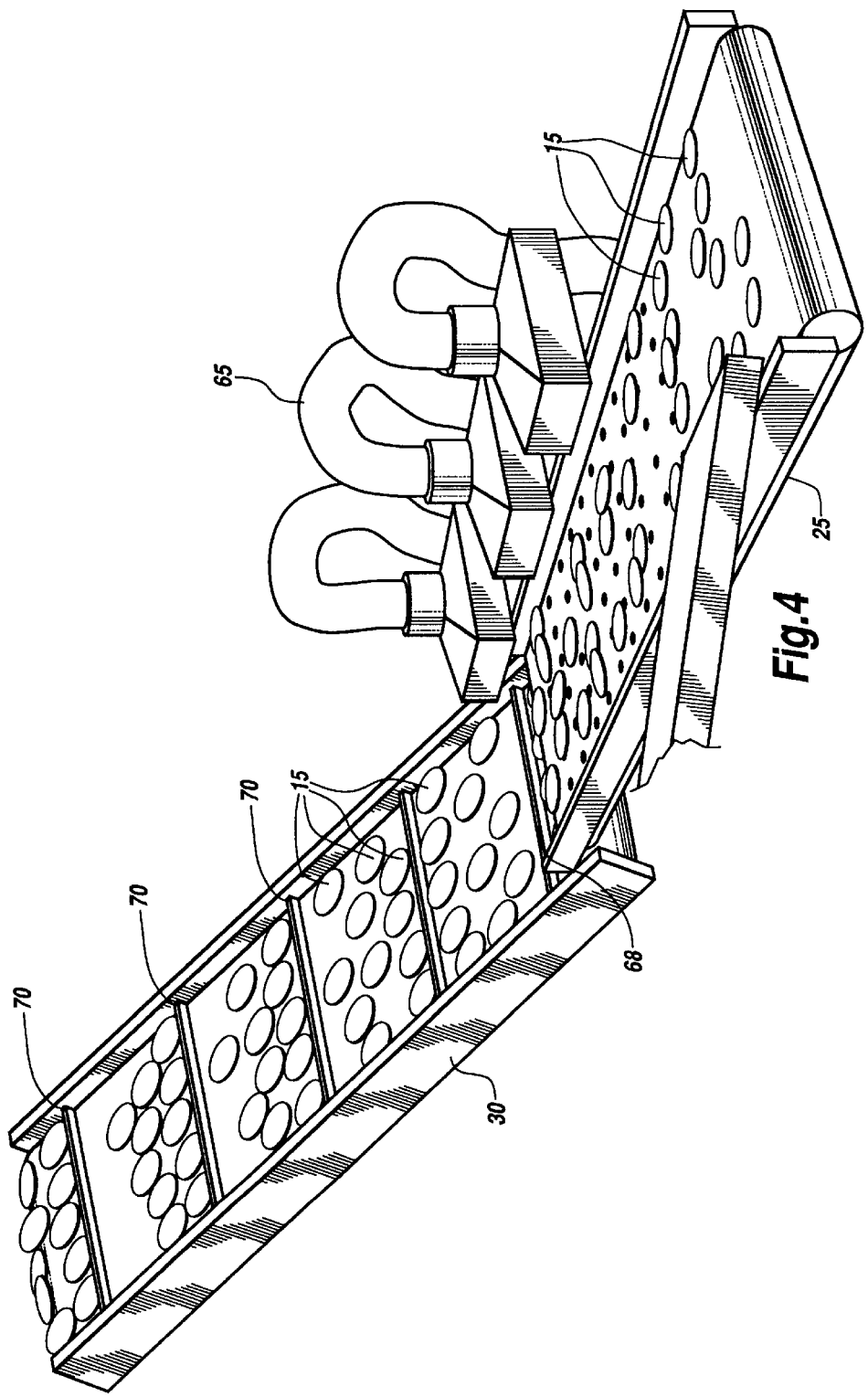

METHOD AND APPARATUS FOR PRODUCT SEPARATION AND STACKING

CROSS REFERENCE TO RELATED APPLICATIONS

This application is a continuation of application Ser. No. 08/421,738, entitled "Method and Apparatus for Product Separation and Stacking" and filed Apr. 13, 1995, by Randall M. Reaves, now abandoned.

TECHNICAL FIELD

This invention relates to the separation and stacking of individual products, and more particularly to a method and apparatus utilizing a die press, conveyor system and shaker table to randomize, separate and stack individual products into a configuration suitable for packaging and shipping.

BACKGROUND OF THE INVENTION

Historically, products that are the output of a die press have been dumped into bins or onto a table, then manually separated and stacked by human operators for packaging and shipping. A number of problems resulted from this process, however.

The products emerging from the die press are frequently contaminated with dust or chaff resulting from the cutting process. This chaff makes the stacking and packaging process unpleasant and more difficult. The presence of chaff also makes the product less attractive to the consumer.

The stacking operation is repetitive and tiring for the human operator and results in a labor-intensive and costly operation for the manufacturer. Production benchmarks are often difficult to forecast with certainty since the output resulting from the stacking operation is highly dependent on the manual dexterity of the individual worker.

One major drawback of manual separation and stacking is that the nature of the process limits the flexibility of the manufacturers with respect to the work schedules of the individual workers. The demand for some products varies with the season and with market conditions. Since manual stacking is tiring and repetitive, a worker is limited in the number of hours he or she is able to perform the stacking operation. Thus, new workers must be trained or temporary workers brought in to increase the output of the plant to meet market demands. The training of new or temporary workers is expensive and burdensome to the manufacturer.

The repetitive nature of the manual separation and packaging also means that mistakes are more likely, since the workers become distracted and bored. Mistakes in packaging can result in quality control problems and customer disappointment with concurrent loss of good will.

Thus, there is a need for an automated system that separates and stacks products that are the output of a die-cutting operation. More specifically, there is a need for an automated system that makes the separating operation less tiresome for the worker, increases efficiency and worker output, reduces labor costs for the manufacturer, results in a higher quality, more consistent product and a more flexible manufacturing process.

SUMMARY OF THE INVENTION

The present invention overcomes the foregoing problems associated with manual stacking operations by providing an apparatus for cutting, cleaning, separating, randomizing and stacking products that are the output of a die press. In accordance with the broader aspects of the invention, the articles cut by the die press are output onto a conveyor, wherein chaff and debris resulting from the cutting process are removed by a stream of air.

The products are then introduced onto a second conveyor system having an incline. The products are allowed to cascade in the direction of the incline to separate them from one another, promoting a random distribution of products. Flows of product are halted by segmentation strips on the conveyor belt. After separation into a singulated product stream, the products are introduced onto the surface of a shaker table.

The shaker table has a number of operator station positions arrayed around its perimeter. Products are further randomized as they progress down the shaker table and are distributed to the various operator stations. In one embodiment, the products are "walked" by the movement of the shaker table through a funneling array, into a slot. The movement of the shaker table provides the impetus for the products which were originally in a flat position upon the surface of the shaker table, to assume an upright position against the sides of the funneling array and the slot.

As the now upright products near the terminus of the slot, the products drop individually into stacking tubes. Stacks of products accumulate in the stacking tubes, ready for the human operators to remove the stacks and place them into packing containers for shipping.

The apparatus for separation, randomizing and stacking efficiently readies die-cut products for shipping without the tedious and tiresome manual labor required by packing methods known to the art. Use of the apparatus described herein also allows manufacturers to produce a higher quality product while using labor resources more effectively. Output per individual worker is increased significantly.

Other advantages and applications deriving from the use of the invention will readily suggest themselves to those skilled in the art from consideration of the following Detailed Description taken in conjunction with the accompanying Drawings.

BRIEF DESCRIPTION OF THE DRAWINGS

A more complete understanding of the invention may be had by reference to the following Detailed Description when taken in conjunction with the accompanying Drawings, wherein:

FIG. 2 shows an example of a sheet containing products before cutting in the die press;

FIG. 3 shows a conveyor for transporting products while removing contaminants from the products;

FIG. 4 is a depiction of the segmented, inclined conveyor that separates, singulates and randomizes the products;

DETAILED DESCRIPTION OF THE INVENTION

Figure 1:
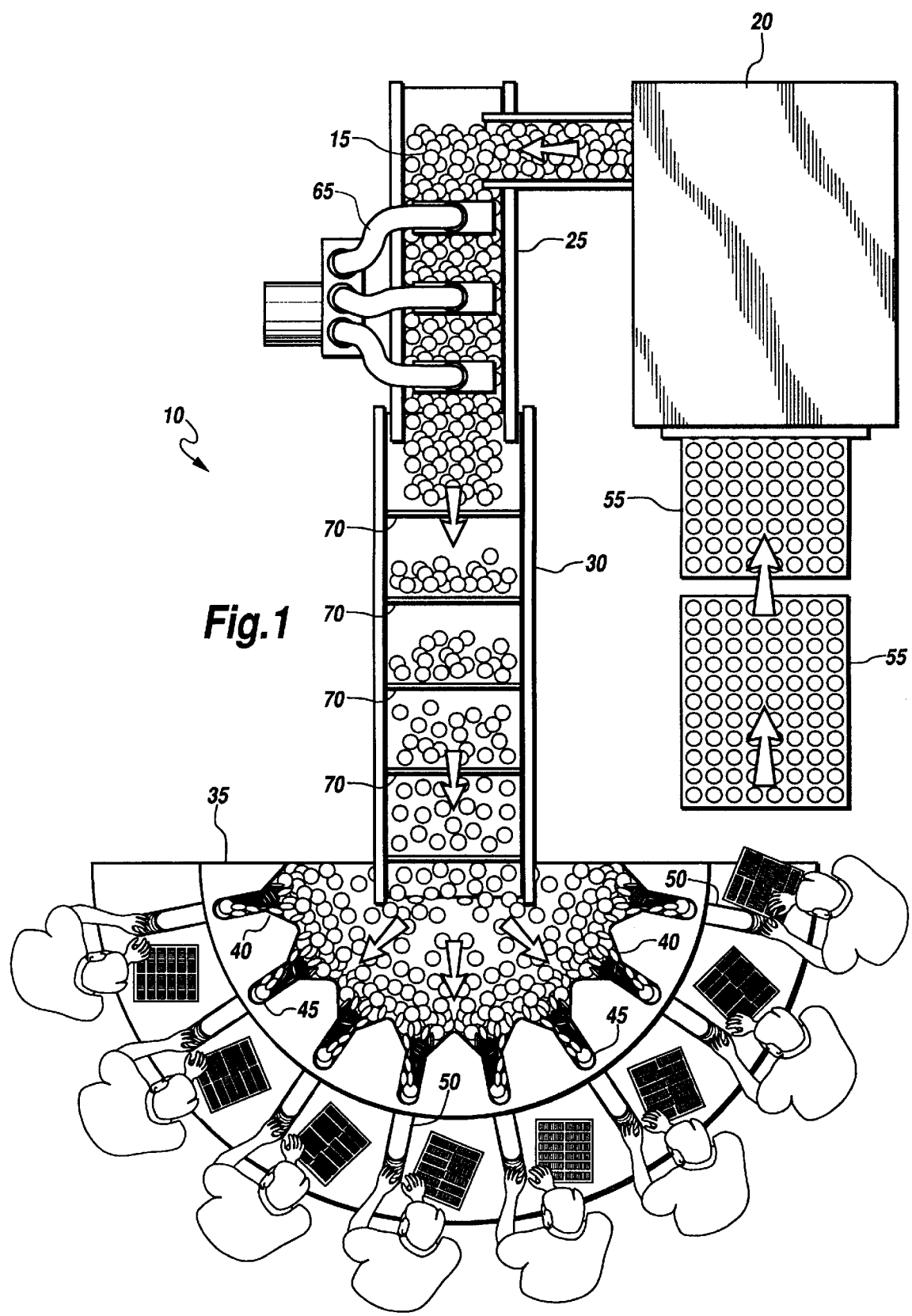
FIG. 1 is an overhead view of the apparatus of the present invention showing the interrelationship of the die press, the conveyor belts and the shaker table and its operators.

Referring now to the Drawings, and particularly to FIG. 1, there is shown an apparatus 10 for separating and stacking products 15 that are the output of a die press 20. The products 15 fall from the die press 20 onto a conveyor 25 where contaminants are removed by, for example, a stream of air. The products 15 are then moved up an inclined conveyor belt 30 where the products 15 are separated one from the other by a combination of gravitational forces and friction. The products 15 are then delivered onto a shaker table 35 where movement of the table "walks" the products into the funneling array 40, the slot 45 and the stacking tube 50.

Die presses, such as one produced by the Consolidated Corporation of 4501 S. Western Blvd., Chicago, Ill. 60609 are well known in the art. In the operation of the apparatus of the present invention, the die press 20 excises individual products 15 from arrays of products, such as sheets 55, as is shown in FIG. 2. Products 15 fall from the die press 20 onto the surface of the air blast conveyor 25.

As shown in FIG. 3, an air blast conveyor 25, such as the one made by Roach Conveyors, Inc., which can be obtained through Interlode Material Handlers of Ft. Worth, Tx., projects a stream of air upwards from apertures 61 to remove any remaining debris or cutting chaff 58 from the products 15. The presence of cutting chaff 58 makes the further processing of the products 15 unpleasant and the products less desirable to the consumer. The cutting chaff 58, blown upwards by the stream of air directed over the products 15 is collected by vacuum system 65.

Referring now to FIG. 4, the air blast conveyor 25 delivers the products to an inclined conveyor 30 which separates the products 15 into individual pieces by gravity and frictional forces. The products 15 with surfaces contacting that of the inclined conveyor 30 will be retained in place on the inclined conveyor 30, held stationary by frictional forces. Individual products 15 lying atop one another will cascade downward, however, as gravitational forces overcome the forces of friction, effecting a separation of the products 15. The products 15 are prevented from cascading to the base 68 of the inclined conveyor 30 by the presence of segmentation strips 70. These segmentation strips 70 catch products 15 that are being drawn downwards by gravitational forces to prevent an accumulation at the base 68 of the inclined conveyor 30.

Figure 5:
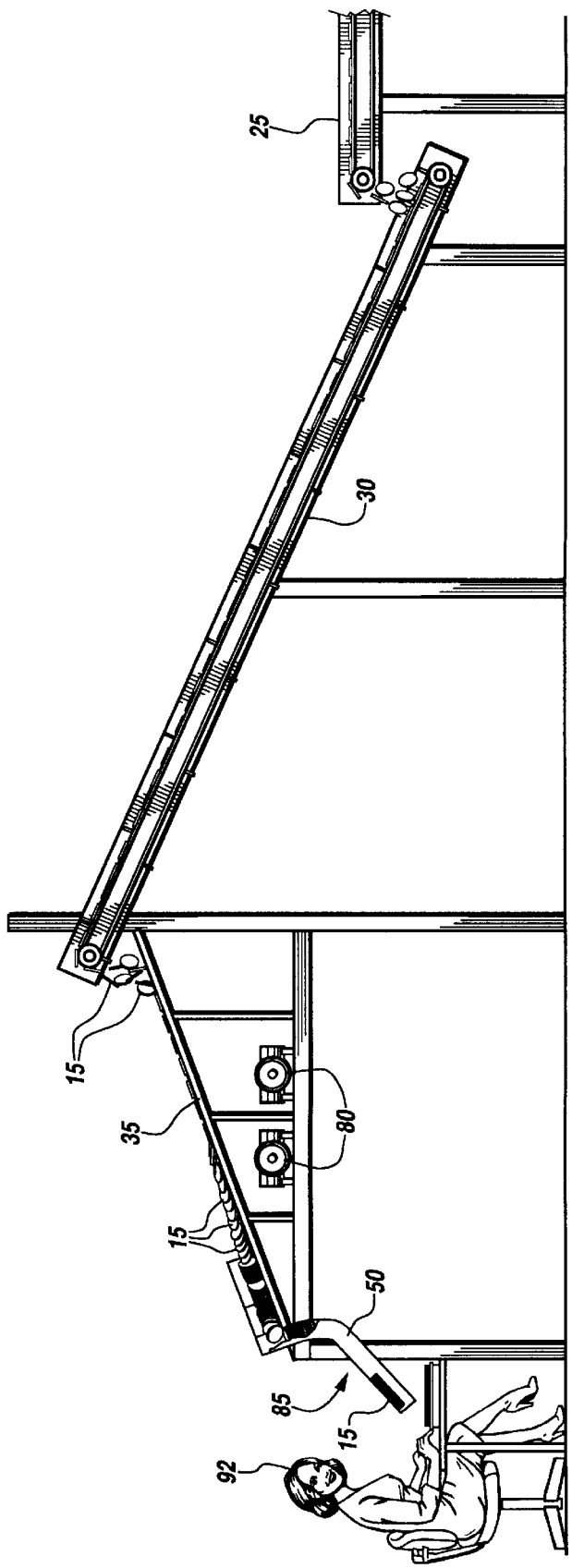
FIG. 5 shows a cut-away side view of the shaker table and its relationship to the conveyor system.

As can best be seen in FIG. 5, the products 15 are delivered from inclined conveyor 30 onto shaker table 35. The shaker table 35 has a truncated semi-conical shape, although other shapes may be used in the apparatus of the present invention. Feeder attendants (not shown) stationed at the intersection of the inclined conveyor 30 and the shaker table 35 may be used to direct the flow of products 15 as the products progress down the shaker table 35.

The downward movement of the products 15 is due to both gravity and a vibratory movement of the shaker table 35. The vibratory movement of the shaker table 35 may be produced in many ways. A preferred method of producing vibratory movement is to attach sources of vibration 80, such as the rotary electric vibrators sold by Houston Vibrator, Inc. of 9921-K Houston, Tx. 77280 to the shaker table 35. The vibrators 80 preferably operate at 3460 vibrations per minute to produce movement of the products 15 down the shaker table 35. The shaker table 35 is preferably constructed of a rigid material, such as sheet metal, that will transmit the vibratory motion to the surface of the shaker table 35 and the products 15.

Figure 6:
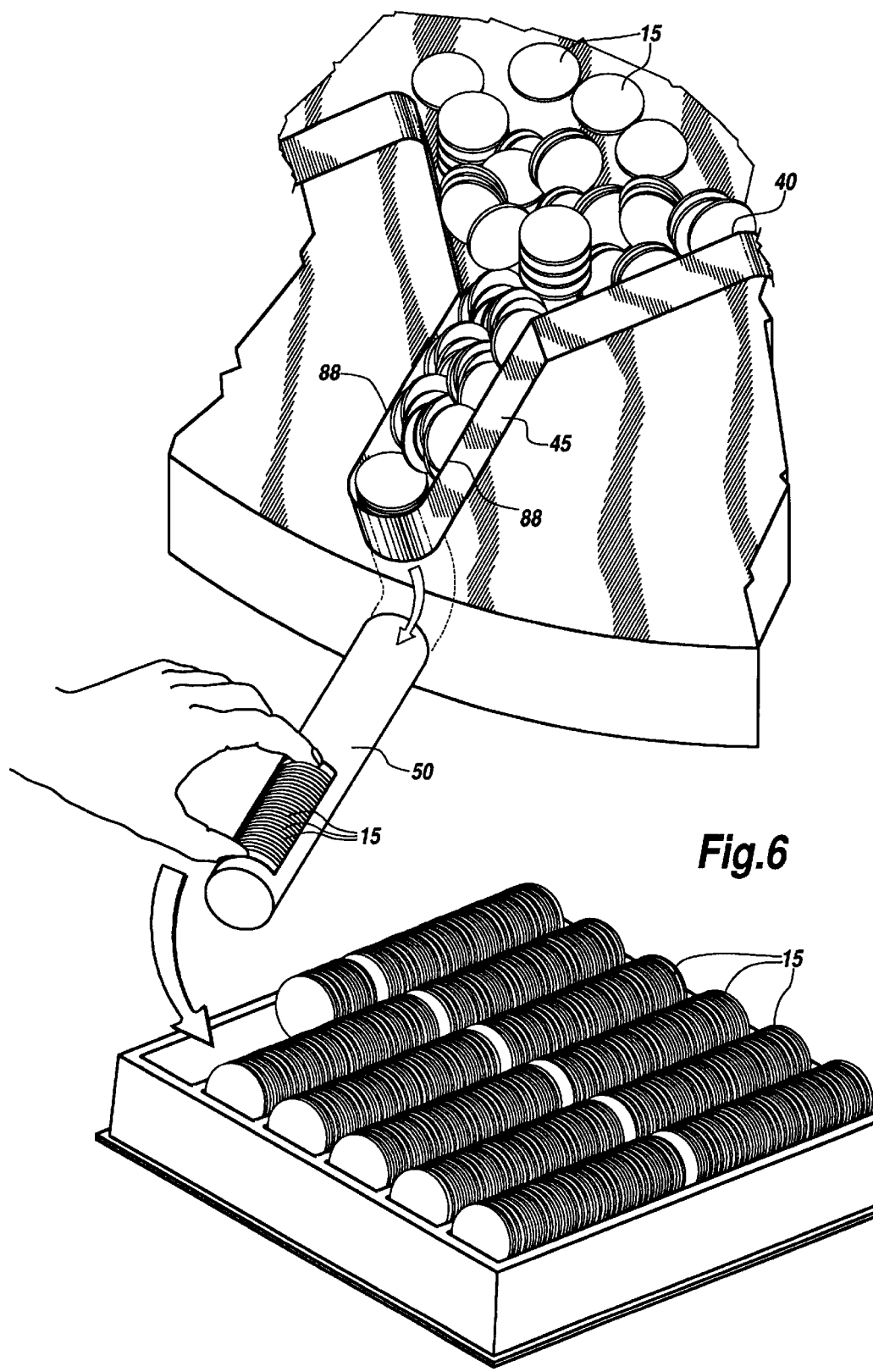
FIG. 6 is close-up view of the funneling array, slot and stacking tube illustrating the products being stacked and readied for packaging.

As the products 15 progress down the shaker table 35, they are directed by the vibratory motion and gravity and/or the feeder attendants (not shown) into one of a number of funneling arrays 40, one of which is shown in detail in FIG. 6. There is one funneling array 40 for each seated attendant station 85. The funneling arrays 40 direct the products 15 toward the slots 45.

The products 15 are generally in a flat position on the shaker table 35 as they approach and pass through the funneling array 40. As the products 15 enter the slot 45, however, the vibratory motion coupled with the proximity of the walls 88 of the slot 45 cause the products 15 to assume an upright position, or to stand on edge. This position allows products 15 to enter the stacking tube 50 individually, and in an orientation suitable for stacking.

Seated attendants 92 at the seated attendant stations 85 remove the stacked products 15 when a suitable number of products have accumulated in the stacking tubes 50. Typically, three to four inches of product are allowed to accumulate before the seated attendant transfers the product to a suitable container, such as tray 96, for packaging and shipping.

One advantage of the apparatus of the present Invention is that the products 15 are randomized as they progress over the conveyors 25 and 30 and shaker table 35. In markets such as those for collectable items, pogs or trading cards for example, some members of a group become more valuable and desirable to the ultimate consumer than others. It is, thus, necessary that the individual products 15 be thoroughly mixed or randomized so that the consumers are assured of a mix of products 15 and an equitable chance of obtaining the highly desirable Individual products. The products 15 are randomized by separation by gravity and frictional forces on inclined conveyor 30 and by the mixing of the products on the shaker table 35.

The method and apparatus of the present invention 10 allows as many as 222,000 products 15 per hour to be cut, processed, stacked and packaged for shipping. The seated attendants 92 have improved their productivity from ten trays per hour to 22 trays per hour, with less repetitive movement and its accompanying stress.

Although a preferred embodiment of the invention has been illustrated in the accompanying Drawings and described in the foregoing Detailed Description, it will be understood that the invention is not limited to the embodiment disclosed, but is capable of numerous rearrangements and modifications of parts and elements without departing from the scope of the invention.

I claim:

1. An apparatus for arranging products, comprising:
   a conveyor having first and second ends, the conveyor operable to receive a stream of products between the first and the second ends and to separate products from the stream of products;
   a disperser comprising a central region and a periphery, the disperser operable to receive separated products from the second end of the conveyor and to disperse the separated products in a plurality of directions substantially radially outward from the central region toward the periphery; and
   an arranger operable to receive dispersed products at the periphery of the disperser and to arrange the dispersed products.

2. The apparatus of claim 1, wherein the conveyor comprises a conveyor belt.

3. The apparatus of claim 1, wherein the conveyor comprises a slip-resistant surface.

4. The apparatus of claim 1, wherein the conveyor comprises one or more separators operable to reduce slippage of separated products along a surface of the conveyor.

5. The apparatus of claim 1, wherein the disperser comprises a shaker table.

6. The apparatus of claim 1, wherein the disperser is operable to vibrate to disperse the separated products.

7. The apparatus of claim 1, wherein at least a portion of the periphery of the disperser is substantially arc-shaped.

8. The apparatus of claim 1, wherein the disperser comprises an inclined surface coupling the central region to the periphery.

9. The apparatus of claim 1, wherein the arranger comprises a stacking tube.

10. The apparatus of claim 1, wherein the arranger comprises a slot operable to receive the dispersed products.

11. The apparatus of claim 1, wherein the conveyor is operable to remove contaminants from the products.

12. The apparatus of claim 1, wherein the conveyor is operable to generate an air stream for direction upon the products.

13. An apparatus for arranging products, comprising:

a conveyor having first and second ends, the conveyor operable to receive a stream of products between the first and second ends and to separate individual products from the stream of products;

a disperser comprising a central region and a periphery, the periphery comprising a substantially arc-shaped portion, the disperser operable to receive separated products from the second end of the conveyor and to vibrate to disperse the separated products substantially radially outward in a plurality of directions from the central region toward the substantially arc-shaped portion of the periphery; and an arranger operable to receive dispersed products at the substantially arc-shaped portion of the periphery and to gather and arrange the dispersed products.

14. The apparatus of claim 13, wherein the conveyor comprises:

a first surface;

a second surface; and a separator operable to separate the first surface from the second surface.

15. The apparatus of claim 13, wherein the arranger is further operable to stack individual products.

16. The apparatus of claim 13, wherein an inclined surface couples the central region to the substantially arc-shaped portion of the periphery of the disperser.

17. The apparatus of claim 13, wherein the disperser comprises an inclined surface having a substantially conical portion.

18. The apparatus of claim 13, wherein the arranger comprises a stacking tube.

19. The apparatus of claim 13, wherein the arranger comprises a slot operable to receive dispersed products.

20. The apparatus of claim 13, wherein the arranger is further operable to reorient the dispersed products for arrangement.

21. The apparatus of claim 13, wherein the conveyor is operable to remove contaminants from the products.

22. The apparatus of claim 13, wherein the conveyor is operable to generate an air stream for direction upon the products.

23. The apparatus of claim 13, wherein the conveyor comprises a slip-resistant surface.

24. A method for arranging products, comprising the steps of:

receiving a stream of products;

separating products from the stream of products;

dispersing the separated products substantially radially outward in a plurality of directions from a central region toward a periphery of a disperser;

receiving dispersed products at the periphery of the disperser; and arranging the dispersed products.

25. The method of claim 24, further comprising the step of removing contaminants from the products by directing an air stream upon the products.

26. The method of claim 24, wherein the step of separating comprises the step of cascading the products down an inclined surface.

27. The method of claim 26, wherein the step of separating further comprises the step of limiting the movement of at least a portion of the products using one or more separators.

28. The method of claim 24, wherein the step of dispersing comprises the step of vibrating a surface supporting the separated products.

29. The method of claim 24, wherein at least a portion of the periphery of the disperser is substantially arc-shaped.

30. The method of claim 24, further comprising the step of randomizing the products.

31. The method of claim 24, further comprising the step of reorienting the dispersed products.

32. The method of claim 24, wherein the step of arranging further comprises stacking the dispersed products.

33. An apparatus for arranging products, comprising:

a conveyor operable to receive a stream of products and to separate products from the stream of products, the conveyor comprising a conveyor belt having a slip-resistant surface and a plurality of separators operable to reduce slippage of separated products along the surface, the conveyor operable to direct an air stream upon the products to remove contaminants from the products;

a disperser coupled to the conveyor and operable to scatter separated products received from the conveyor, the disperser comprising a shaker table having a vibrator and an inclined surface; and an arranger coupled to the disperser and operable to arrange scattered products received from the disperser, the arranger comprising a slot operable to receive scattered products and a stacking tube, the arranger operable to receive scattered products along at least a portion of the periphery of the disperser and to reorient the received products using the slot for arrangement using the stacking tube.

* * * * *